United States Patent [19]
Joppeck

[11] Patent Number: 6,039,160
[45] Date of Patent: Mar. 21, 2000

[54] FRICTION TORQUE TRANSMITTER WITH A ONE-WAY ACTUATOR

[75] Inventor: Dwayne Paul Joppeck, Saline, Mich.

[73] Assignee: General Motors Corporation, Detroit, Mich.

[21] Appl. No.: 09/145,959

[22] Filed: Aug. 31, 1998

[51] Int. Cl.[7] .......................... F16D 25/063; F16D 25/02
[52] U.S. Cl. ...................... 192/52.5; 192/54.52; 192/83; 192/85 AA
[58] Field of Search ..................................... 192/35, 41 R, 192/47, 70.23, 83, 85 A, 93 A, 103 F, 52.5, 85 AA, 45, 48.92, 54.52

[56] References Cited

U.S. PATENT DOCUMENTS

| | | | |
|---|---|---|---|
| 2,827,994 | 3/1958 | Tiedeman et al. | 192/93 A |
| 3,404,585 | 10/1968 | Roper | 192/35 |
| 3,482,669 | 12/1969 | Pegg | 192/41 R |
| 3,578,119 | 5/1971 | Auriol | 192/70.23 X |
| 3,674,118 | 7/1972 | Klaue | 192/70.23 X |
| 4,560,034 | 12/1985 | Windish et al. | 192/83 X |
| 5,469,950 | 11/1995 | Lundstrom et al. | 192/103 F X |
| 5,540,119 | 7/1996 | Hudson | 192/93 A X |

FOREIGN PATENT DOCUMENTS

| | | |
|---|---|---|
| 259885 | 7/1995 | Japan . |
| 279992 | 7/1995 | Japan . |

*Primary Examiner*—Charles A Marmor
*Assistant Examiner*—Ha Ho
*Attorney, Agent, or Firm*—Dean L. Ellis; Michael J. Bridges

[57] ABSTRACT

A torque transmitting device has a plurality of friction discs alternately splined to a housing and a hub. A fluid operated piston is slidably disposed in the housing and is fluid actuated to enforce frictional engagement between the friction discs and establish a torque transmitting interface between the housing and the hub. A one-way device is disposed in the housing at a location axially spaced from the piston. The one-way device has one member splined to the housing and another member splined to the hub. A plurality of actuating elements are disposed between the one-way members to enforce axial separation thereof upon a speed differential between the one-way members in one direction. The axial separation causes engagement of the friction discs to halt the speed differential and provide a one-way torque transmitting apparatus independent of the piston.

4 Claims, 2 Drawing Sheets

FRICTION TORQUE TRANSMITTER WITH A ONE-WAY ACTUATOR

TECHNICAL FIELD

This invention relates to friction devices having a fluid operated piston actuator and a one-way actuator

BACKGROUND OF THE INVENTION

Most of the automatic transmissions in use currently have at least one and often more one-way torque transmitting devices which are used to establish a one-way torque transmitting connection during the establishment of a gear ratio in the transmission. Many of these devices have a friction device disposed in parallel drive relation to establish a positive torque transmitting connection in bypassing relation with the one-way device.

It is also known to have the one-way device installed in a fluid operated piston to assist in the establishment of a gear ratio in the transmission. In these devices, the piston must be actuated, usually by pressurized fluid, before the one-way device becomes active.

SUMMARY OF THE INVENTION

It is an object of the present invention to provide an improved friction device having a one-way actuator.

In one aspect of the present invention, a multi-disc friction device has a one-way device having an actuator which imposes an axial apply force to the discs.

In another aspect of the present invention, a fluid operated piston is also used to provide selective actuation of the friction device without the aid of the one-way device.

In yet another aspect of the present invention, the one-way actuator and the fluid operated piston are positioned at axially opposite sides of the friction discs.

In still another aspect of the present invention, the pressure plate engaged by the piston is the backing plate for the one-way device.

In a further aspect of the present invention, the one way device is relieved of a portion of the torque being transmitted by the engagement of the friction discs.

In a yet further aspect of the present invention, the friction discs are alternately, drivingly connected to first and second radially spaced transmission components, the one-way actuator abuts a disc connected to the first of the components during engagement, and the piston abuts a disc connected to the second of the components.

In one embodiment of the present invention, a one-way device has a pair of axially spaced annular members, one of which has a plurality of cam faces formed thereon. A plurality of rolling members are disposed between the annular members adjacent respective cam faces. The rollers are urged away from the cam faces by respective spring members. The annular members are splined to respective inner and outer transmission components. Also splined to the inner and outer transmission components are a plurality of alternately spaced friction discs. A first of the friction discs, immediately adjacent one of the annular members, and the annular member are splined to the inner transmission component. This disc is the pressure plate during one-way actuation of the friction device.

A fluid operated piston is slidably disposed in the outer transmission component as is a second of the friction discs immediately adjacent thereto. This friction disc is the pressure plate during piston actuation of the friction device. A plurality of return springs urge the piston axially away from the friction discs. A retaining ring secured in the outer component limits the axial movement of the disc adjacent the piston. The second friction disc becomes the reaction plate during one-way actuation.

A third of the friction discs, splined to the outer component and disposed adjacent the first of the discs. A retaining ring is secured in the outer component to limit the axial movement of the third disc toward the first disc. The third disc becomes the reaction plate during actuation by the piston.

The friction discs relieve the one-way device from transmitting a majority of the torque transmitted during engagement of the device. The one-way device only actuates the friction discs when one of the transmission components is attempting to rotate in one directional sense faster than the other component. The piston, on the other hand is pressurized to enforce engagement of the friction device regardless of the rotational direction of the components. The piston actuation is independent of the one-way device actuation and vise versa.

DESCRIPTION OF AN EXEMPLARY EMBODIMENT

Figure 1:
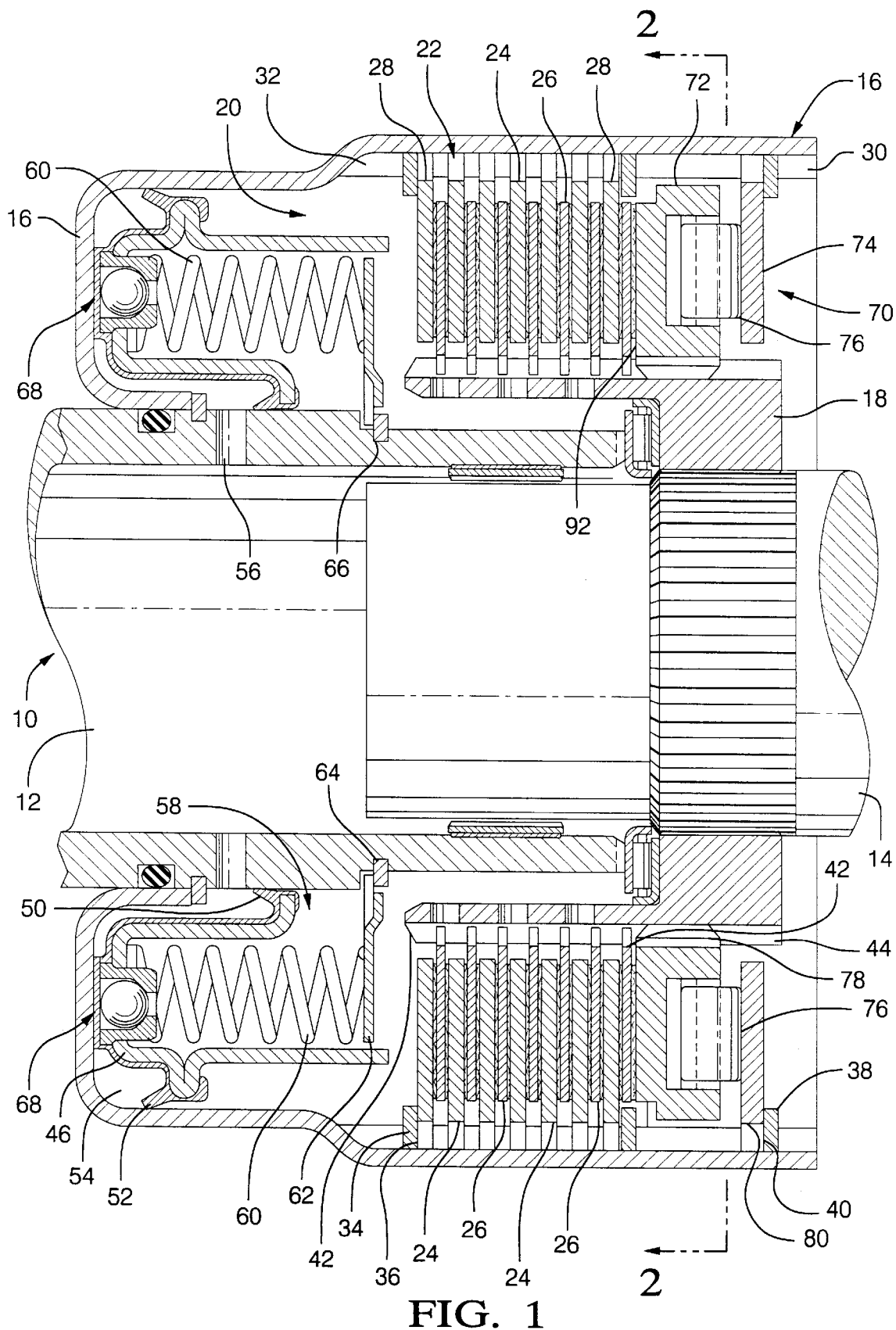
FIG. 1 is a sectional elevational view of a friction torque transmitter incorporating the present invention.

Referring to the drawings, wherein like characters represent the same or corresponding components throughout the several views, there is seen in FIG. 1 a friction torque transmitting device 10. The device 10 is presented as a rotating clutch, however the friction device rnay also be a stationary clutch or brake. Both such devices will work equally well with the present invention. The friction device 10 has an input shaft 12 and an output shaft 14. An input hub 16 is secured to or drivingly connected with the shaft 12. An output hub 18 is drivingly connected or otherwise secured to the output shaft 14. The hub 18 extends into and is radially spaced from the hub 16 such that an annular cavity 20 is formed therebetween.

A friction disc pack 22 is disposed in the cavity 20 and is comprised of steel friction discs 24 and fiber faced friction discs 26. The discs 24 have an outer splined periphery 28 which engages a spline 30 formed on an inner surface 32 of the hub 16. The discs 24 can slide axially in the spline 30 relative to the hub 16. The leftmost disc 24 is limited in leftward axial movement by a retaining ring 34 which is secured in a groove 36 formed in the hub 16. The rightmost disc 24 is limited in rightward axial movement by a retaining ring 38 which is secured in a groove 40 formed in the hub 16.

The discs 26 each have a splined inner periphery 42 that is splined to the hub 18 through a spline 44. As with the discs 24, the discs 26 can move axially on the spline 44. The axial movement of the discs 24, 26 allow for free-running clearance in the friction disc pack 22 when the friction torque transmitting device is disengaged. This is a well known expedient which improves the efficiency of the friction device 10.

A piston 46 is slidably disposed in the cavity 20 formed in the hub 16. The piston 46 has inner and outer annular seals 50, 52 which cooperate with the cavity 20 and the piston 46 to form an annular fluid chamber 54. Fluid is selectively admitted to the chamber 54 through a passage 56 formed in the shaft 12. The control of fluid into the chamber 54 can be accomplished in accordance with any of the well known transmission control mechanisms that are designed to deliver pressurized fluid on command when the piston 46 is to be actuated. The fluid pressure, when present, will urge the piston 46 rightward toward the friction disc pack 22 and into engagement with the leftmost disc 24.

A return spring assembly 58, comprised of a plurality of springs 60 and a retainer plate 62 are positioned in the cavity 20 and limited in rightward movement by a retaining ring 64 secured in a groove 66 formed in the shaft 12. The springs 60 abut the piston 46 and urge it leftward in the cavity 20 to force fluid from the chamber 54 when the pressure level is reduced by the control mechanism. A conventional ball-dump valve 68 also assists in removing the fluid from the chamber 54 as well as preventing pressure build-up in the chamber 54 due to centrifugal forces. The operation of these valves 68 is well known as they have been used in automatic transmission for many years.

When the piston 46 is urged rightward by pressure, it will abut the leftmost disc 24 and urge all of the discs 24, 26 into frictional engagement to provide a torque transmitting connection between the hubs 16 and 18. Any torque imposed on the shaft 12 will be transmitted to the shaft 14. The shaft 12 can be connected to a conventional transmission input member such as a torque converter or gear member and the shaft can be connected to any conventional transmission member such as a gear or a housing. When the shaft 14 is connected to a gear, the device 10 will be a clutch and when the shaft 14 is connected with a housing, the device will be a brake.

A one-way actuator mechanism 70 is assembled in the cavity 20 at the rightmost end of the disc pack 22. The mechanism 70 includes a first plate member or cam plate 72, a second plate member or race plate 74 and a plurality of roller members 76 which are disposed between the plates 72 and 74. The plate 72 is drivingly connected with the spline 44 through a splined inner periphery 78 and therefore, rotates with the shaft 14. The plate 74 is drivingly connected with the spline 30 through a splined outer periphery 80 and therefore, rotates with the shaft 12.

Figure 2:
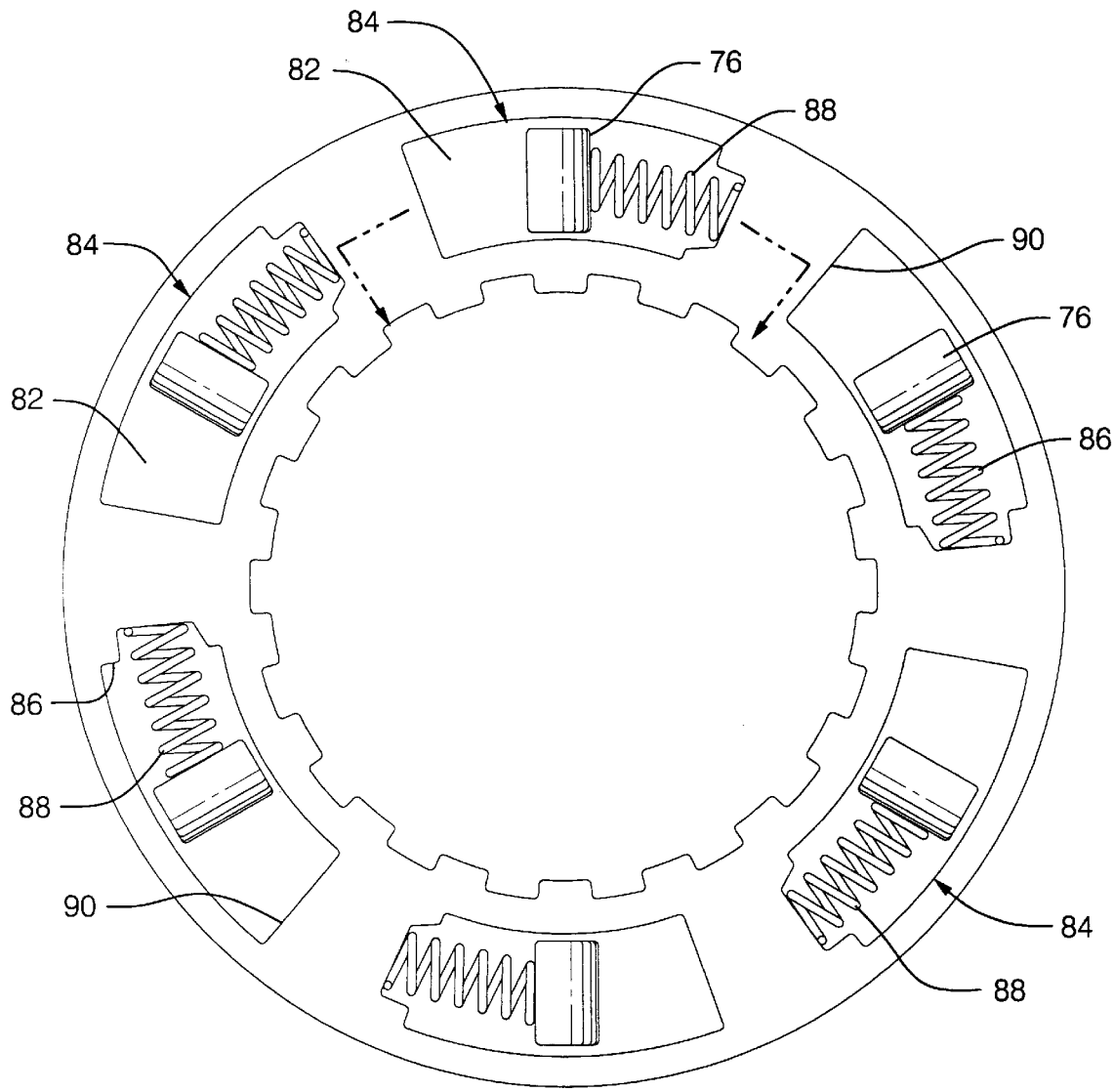
FIG. 2 is a view taken along line 2—2 in FIG. 1.
Figure 3:
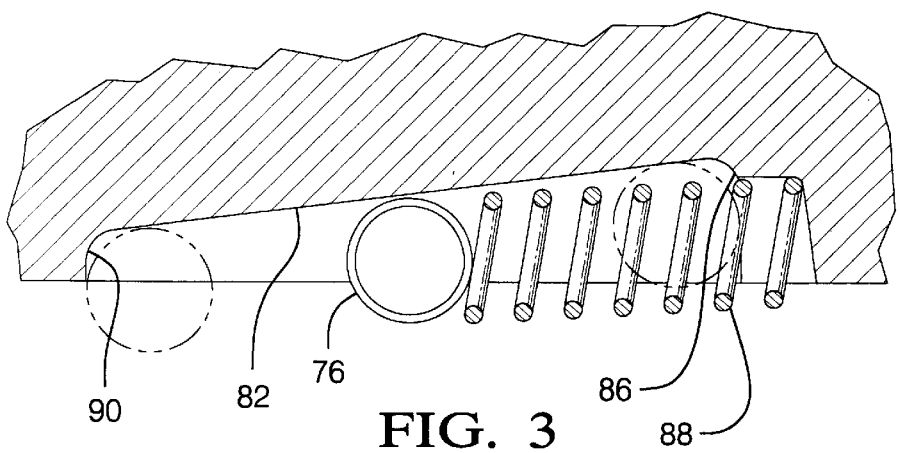
FIG. 3 is a view taken along line 3—3 in FIG. 2.

The plate 72, as best seen in FIGS. 2 and 3, has a plurality of cam ramps 82 formed in pockets 84. The plate 74 has flat parallel sides. The rollers 76 are positioned in the pockets 84 so as to abut both plates 72, 74. The rollers are urged away from deep end portions 86 of the pockets 84 by springs 88 and toward shallow end portions 90.

When the rollers 76 are urged against the spring set position shown toward the deep ends 86, the one-way actuator mechanism 70 resembles and operates similar to a needle thrust bearing, thereby permitting relative rotation between the plates. This occurs when the cam plate 72 rotates counterclockwise, as viewed in FIG. 2, relative to the race plate 74 or when the race plate 74 rotates clockwise relative to cam plate 72.

When the rotation of the cam plate 72 is clockwise relative to the race plate 74 or the rotation of the race plate 74 is counterclockwise relative to cam plate 72, the rollers 76 will be urged to roll toward the shallower end 90 of the pockets 84 with the assistance of the springs 88. This will cause the cam plate 72 to separate from the race plate 74 in an axial direction. The cam plate 72 has an apply surface 92 that abuts the rightmost fiber faced plate 26. This axial movement of the cam plate 72 forces the plates 24, 26 into frictional engagement to apply the friction torque transmitting device 10 resulting in conjoint rotation of the shaft 12 and shaft 14.

The leftmost steel plate 24, which is the pressure plate during piston engagement, is the reaction plate for the friction torque transmitting device 10 during one-way actuation. This permits independent actuation of the device 10 by the one-way actuator 70 as well as independent actuation by the fluid operated piston 46.

I claim:

1. A friction torque transmitter comprising:

an input member; an output member;

a pack of friction disc members alternately drivingly connected to said input and output members;

a fluid operated piston operative to enforce frictional engagement of said friction disc members to support torque transfer in two rotational directions, said piston engaging a first of said friction disc members and a second of said friction disc members providing a reaction member during piston enforced engagement; and a one-way actuator operatively connected between said input and output members to enforce frictional engagement only in one rotational direction in response to a speed differential between said input and output members in said one direction, said one-way actuator having an apply surface engaging a third of said friction disc members, and reaction means between one of said input or output members and said first of said friction disc members so that said first of said friction disc members is capable of providing a reaction member during one-way enforced engagement even in the absence of fluid-operated piston enforced engagement.

2. A friction torque transmitter comprising:

an input driving member;

an output driven member;

a plurality of first friction disc members drivingly connected with said input member;

a plurality of second friction disc members interspersed between adjacent ones of said first disc members and being drivingly connected with said output member;

a one-way actuator having a first member drivingly connected with one of said input or output members, a second member drivingly connected with the other of said input or output member and means for enforcing separation of said first and second members in response to said input member being rotated in one direction faster than said second member to cause abutment between one of said friction disc members and one of said one-way members to enforce frictional engagement of said friction disc members; and a fluid operated piston disposed adjacent another of said friction disc members and axially spaced from said one-way actuator, said piston being adapted to frictionally engage said friction disc members independently of said one-way actuator, and reaction means between one of said input or output members and one of said friction disc members so that even in the absence of fluid operation of said piston such one friction disc member is effective as a reaction member during one-way engagements another of said friction disc members being effective as a reaction member during piston engagement.

3. The friction torque transmitter defined in claim 2 further comprising:

said first member being a flat annular plate drivingly connected with said input member; and said second member being drivingly connected with said output member and having a plurality of ramp portions axially facing said first member and said separation enforcing means comprising a plurality of rollers engaging respective ramp portions and being urged into abutment with both said first and second members.

4. The friction torque transmitter defined in claim 2 further comprising:

said one friction disc being abutted by said fluid operated piston during piston engagement and abutting a retaining device during one-way engagement.

* * * * *